(12) United States Patent
Huiqing et al.

(10) Patent No.: US 7,441,563 B2
(45) Date of Patent: Oct. 28, 2008

(54) THERMOSTATIC EXPANSION VALVE WITH CHECK VALVE

(75) Inventors: Li Huiqing, Chesterfield, MO (US); Ronald L. Campbell, St. Charles, MO (US); Michael J. Noble, St. Charles, MO (US); George J. Sciuto, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/706,789

(22) Filed: Feb. 14, 2007

(65) Prior Publication Data
US 2007/0193630 A1  Aug. 23, 2007

Related U.S. Application Data

(63) Continuation-in-part of application No. 11/357,633, filed on Feb. 17, 2006.

(51) Int. Cl.
*F16K 15/00* (2006.01)

(52) U.S. Cl. .................. 137/601.21; 137/533.25; 236/92 B

(58) Field of Classification Search .............. 137/601.2, 137/601.21, 533.19, 855, 856, 527, 527.6, 137/533.25; 236/92 B; 62/225
See application file for complete search history.

(56) References Cited

U.S. PATENT DOCUMENTS

| 664,146 | A | * | 12/1900 | Hackett | ............... 137/533.25 |
|---|---|---|---|---|---|
| 919,155 | A | * | 4/1909 | Giffen | ............... 137/533.25 |
| 2,274,436 | A | * | 2/1942 | Spence | ............... 137/527.8 |
| 3,154,096 | A | * | 10/1964 | Bell | ............... 137/543.21 |
| 3,292,658 | A | * | 12/1966 | Scaramucci | ............... 137/527.2 |
| 3,809,119 | A | * | 5/1974 | Cave | ............... 137/527.8 |
| 4,886,085 | A | * | 12/1989 | Miller | ............... 137/1 |
| 4,964,567 | A | | 10/1990 | Heffner et al. | ............... 236/92 |
| 5,251,459 | A | * | 10/1993 | Grass et al. | ............... 137/539 |
| 6,354,510 | B1 | * | 3/2002 | Petersen | ............... 236/92 B |
| 6,691,924 | B1 | * | 2/2004 | Vestergaard et al. | ... 236/92 B |

OTHER PUBLICATIONS

International Search Report; Date of completion of search: Mar. 3, 2008; International Application No. PCT/US 0762394; Authorized officer: Lee W. Young; 7 pages.

* cited by examiner

*Primary Examiner*—Stephen M Hepperle
(74) *Attorney, Agent, or Firm*—Harness, Dickey & Pierce, P.L.C.

(57) ABSTRACT

A valve is provided that comprises a valve body including an inlet, an outlet, and a check valve chamber having an opening through the side of the valve body. The valve has a cover secured within the side opening in the valve body. A first valve opening is disposed between the inlet chamber and outlet chamber. A control valve is movable relative to the first valve opening to regulate fluid flow through the first opening when fluid flow is in the inlet-to-outlet direction, and is movable to engage the first valve opening to restrict fluid flow in the outlet-to-inlet direction. The valve comprises a second valve opening disposed between the check valve chamber and the outlet chamber. A check valve member is movable relative to the second valve opening to restrict forward flow and permit reverse flow through the second valve opening.

12 Claims, 5 Drawing Sheets

THERMOSTATIC EXPANSION VALVE WITH CHECK VALVE

CROSS REFERENCE TO RELATED APPLICATIONS

This application is a continuation-in-part of commonly assigned, co-pending U.S. patent application Ser. No. 11/357,633, filed Feb. 17, 2006, which is hereby incorporated herein by reference.

FIELD OF THE INVENTION

The present disclosure relates to thermostatic expansion valves for controlling the flow of refrigerant to an evaporator.

BACKGROUND OF THE INVENTION

Thermostatic expansion valves are used to control or meter the flow of refrigerant to an evaporator in an air conditioning system, to provide a refrigerant flow rate into the evaporator that approximately matches the refrigerant flow exiting the evaporator. The thermostatic expansion valve typically permits fluid flow from the inlet to the outlet during normal operation of the air conditioning system, where the fluid at the inlet is typically at a higher pressure than the fluid at the outlet. Where the air conditioning system also functions as a heat pump in which refrigerant flow is reversed, a check valve is typically plumbed in parallel to the expansion valve to permit refrigerant flowing in a direction opposite that of the typical expansion valve to bypass the valve.

SUMMARY OF THE INVENTION

The present disclosure relates to various embodiments of a thermostatic expansion valves that includes a check valve member. The various embodiments include a first valve element that is movable relative to a first valve opening to regulate fluid flow through the valve from the inlet to the outlet. The thermostatic expansion valve also has a second passage for permitting fluid flow through the valve from the outlet to the inlet when fluid flow is in a reverse direction. One embodiment of a valve for control of fluid flow is provided that comprises a valve body having an inlet chamber and an outlet chamber, and a first valve opening and second valve opening disposed between the inlet chamber and outlet chamber. The valve includes a control valve element that is movable relative to the first valve opening to regulate the rate of fluid flow from the inlet through the outlet, and movable to sealingly engage the first valve opening to restrict fluid flow through the first valve opening. In one embodiment, the valve includes a check valve member having a generally flat portion and at least one aligning member projecting therefrom. The check valve member is movable relative to the second valve opening in response to fluid pressure acting against the flat portion. The check valve member is movable to engage the second valve opening to prevent fluid flow through the second valve opening when fluid flow is in the inlet-to-outlet direction, and movable to permit fluid flow through the second valve opening to the inlet when fluid flow is in the outlet-to-inlet direction.

In another aspect of the present invention, various embodiments of a check valve member having a generally flat portion are provided, which embodiments are adapted to seal against a valve opening within a valve body. In one embodiment, the check valve member includes a generally flat portion configured to seal against a valve opening within a valve body to restrict fluid flow therethrough, and at least one aligning member projecting from the flat portion. The at least one aligning member projects in a direction generally orthogonal to flat portion, wherein the at least one aligning member is adapted to be received within at least one slot in a valve body to guide the movement of the check valve member relative to an adjacent valve opening. The generally flat portion has a sufficient surface area on one side for enabling fluid pressure acting there against to cause the generally flat portion to seal against an opening within a valve body to restrict fluid flow therethrough.

Further areas of applicability of the present disclosure will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EMBODIMENTS

The following description of the various embodiments are merely exemplary in nature and are in no way intended to limit the invention, its application, or uses.

Figure 1:
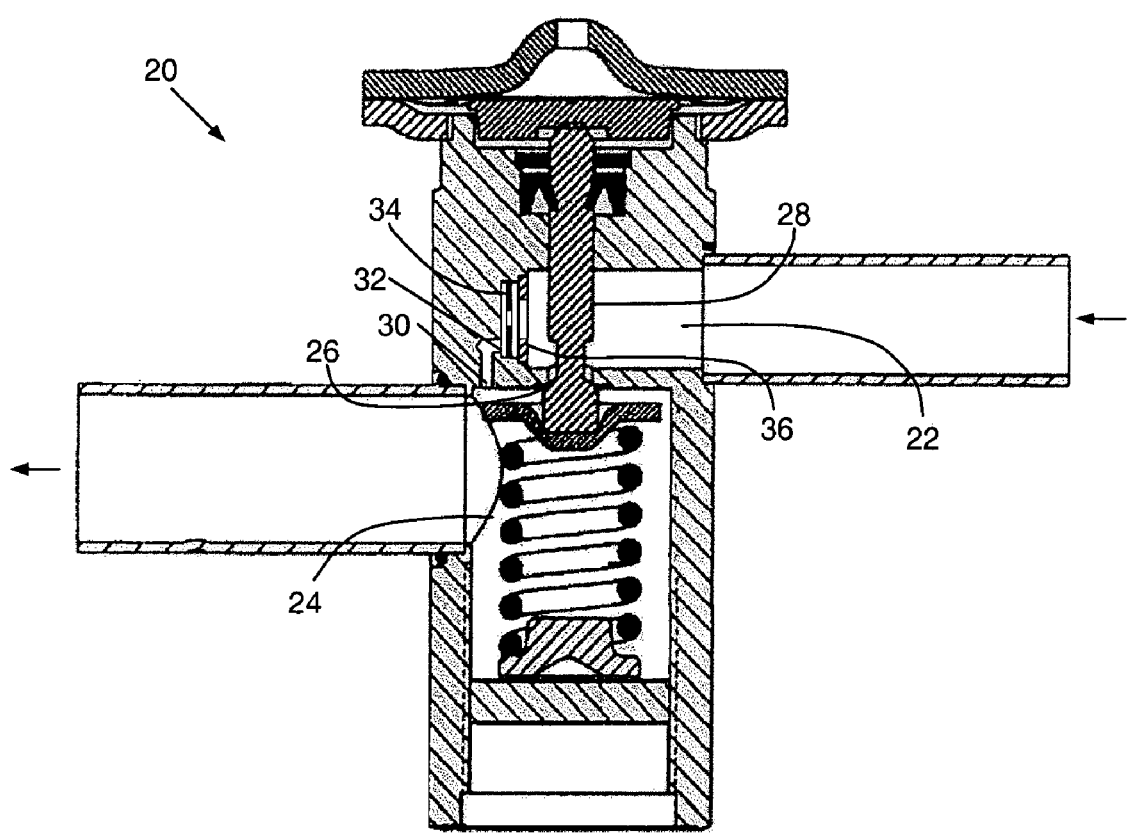
FIG. 1 is a cross-sectional side view of one embodiment of a thermostatic expansion valve in accordance to the principles of the present disclosure.

One embodiment of a thermostatic expansion valve in accordance with the present disclosure is generally shown in FIG. 1 at 20. The thermostatic expansion valve 20 comprises an inlet 22, an outlet 24, a first valve opening 26 between the inlet 22 and outlet 24, and a first control valve element 28 movable relative to the valve opening 26 to regulate fluid flow through the expansion valve 20 when fluid flow is in the inlet-to-outlet direction as would typically occur during normal air conditioner operation. The control valve element 28 is in connection with a diaphragm that is movable in response to fluid pressure changes, which movement regulates the flow through the valve opening 26. The control valve element 28 is also movable to sealingly engage the first valve opening 26 when fluid flow is in the outlet-to-inlet direction, such that fluid flow in a reverse direction through the first valve opening 26 is prevented.

The thermostatic expansion valve 20 further comprises a passageway 30 entirely disposed within the valve body. The passageway 30 extends from the valve outlet chamber 24 to a second valve opening 32 that is in communication with the inlet chamber 22. The valve 20 comprises a second valve element 34 that is movable relative to the second valve opening 32. The second valve element 34 is movable relative to the second valve opening 32 to restrict fluid flow through the second valve opening 32 when fluid flow is in the inlet-to-outlet direction. The second valve element 34 is also movable to permit fluid flow through the passageway 30 and second valve opening 32 when fluid flow is in the outlet-to-inlet direction.

In one embodiment, the second valve element 34 functions as a check valve, and comprises a generally circular or disk-shaped plate. When fluid flow through the valve 20 is in the inlet-to-outlet direction, the fluid pressure against the second valve element or check valve plate 34 moves the check valve plate 34 against the second valve opening 32. The check valve plate 34 is adapted to engage the second valve opening 32 to substantially restrict or prevent the flow of fluid from the inlet chamber 22 through the second valve opening 32 and passage 30 towards the outlet chamber 24. Thus, the check valve plate 34 does not permit fluid flow from the inlet 22 through the second valve opening 32 to the outlet 24.

When fluid flow through the valve 20 is in the outlet-to-inlet direction, the fluid pressure against the check valve plate 34 moves the check valve plate 34 away from the second valve opening 32. The check valve plate 34 further comprises at least one opening, through which fluid may pass when the check valve plate 34 has moved away from the second valve opening 32 to a an open position. The valve 20 further comprises a retaining member 36 that is adapted to be secured within the valve to limit the movement or travel of the check valve plate 34 relative to or away from the second valve opening 32. The retaining member 36 is preferably a plate that includes at least one opening through which fluid may pass when the check valve plate 34 is in a position to permit fluid flow through the second valve opening 32. The retaining plate 36 is preferably configured to be secured within the valve body 20 by a means selected from one of a group consisting of an interference press fit, an adhesive, an ultrasonic weld, or a weld. Thus, in reverse flow situations, the check valve moves away from the second valve opening 32 towards the retaining plate 36, in which position reverse fluid flow is permitted from the outlet 24 through the passage 30 to the second valve opening 32, through the at least one opening in the check valve plate 34 and retaining plate 36, and to the inlet 22.

Figure 2:
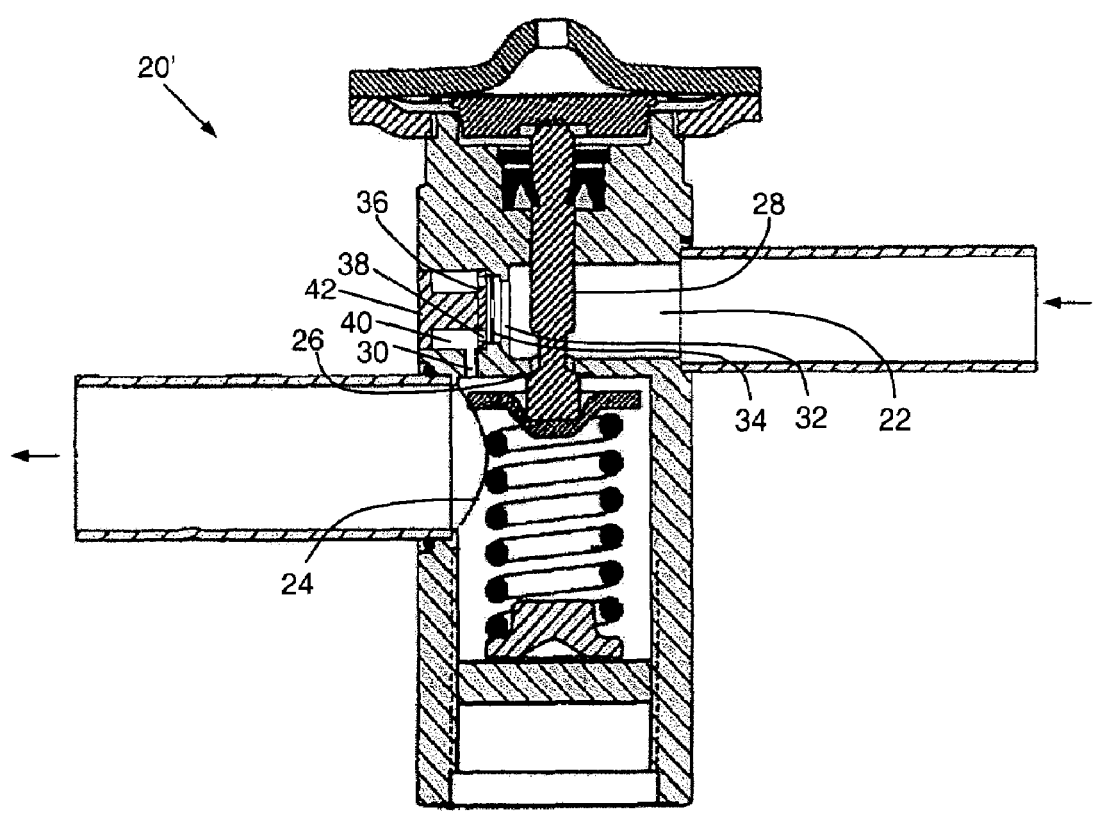
FIG. 2 is a cross-sectional side view of a second embodiment of a thermostatic expansion valve in accordance to the principles of the present disclosure.

In a second embodiment shown in FIG. 2, the thermostatic expansion valve 20' comprises a valve body having an inlet chamber 22, an outlet chamber 24, a side chamber 40, and a passageway 30 between the inlet chamber 22 and the side chamber 40. The passageway 30 is entirely disposed within the valve body, and may be oriented perpendicularly to the side chamber 40. Alternatively, the passageway may also be oriented at an angle relative to the side chamber for purposes of simplifying the manufacturing of the valve.

The second embodiment comprises a first valve opening 26 disposed between the inlet chamber 22 and outlet chamber 24, and also a control valve element 28 movable relative to the first valve opening 26 to regulate fluid flow from the inlet 22 through the outlet 24 when fluid flow is in the inlet-to-outlet direction. The control valve element 28 is in connection with a diaphragm that is movable in response to fluid pressure changes, which movement regulates the flow through the valve opening 26. The control valve element 28 is further movable to engage the first valve opening 26 when fluid flow is in the outlet-to-inlet direction, to substantially restrict or prevent the reverse flow of fluid through the first valve opening 26 when fluid flow is in the outlet-to-inlet direction. Thus, the first valve element 28 does not permit fluid flow from the outlet 24 through the first valve opening 26 to the inlet 22.

The second embodiment 20' comprises an opening 32 disposed between the side chamber 40 and inlet chamber 22, and a movable check valve plate 34. The valve 20' further comprises a retaining member 36 that is adapted to be secured within the side chamber 40 in the valve body, to limit the movement or travel of the check valve plate 34 between the opening 32 and the retaining member 36. The retaining member 36 is preferably a plate that includes at least one opening 38 through which fluid passes when the check valve plate 34 is in a position to permit fluid flow. The retaining plate 36 is preferably configured to be secured within the valve body 20' by a cover plate 42 having a projection for abutting the retaining plate 36, as shown in FIG. 2. The cover 42 is secured to the valve body for enclosing and sealing off the side chamber 40. The cover plate 42 is preferably configured to be secured within the side chamber 40 of the valve body by a means selected from one of a group consisting of an interference press fit, an adhesive, an ultrasonic weld, or a weld.

In the second embodiment, the check valve element 34 is movable relative to the at least one opening 38 in the restriction plate 36 to restrict fluid flow through the passage 30 and opening 32 when fluid flow is in the inlet-to-outlet direction. When fluid flow through the valve 20' is in the inlet-to-outlet direction, the fluid pressure against the check valve plate 34 moves the check valve plate 34 towards a position of engagement against the at least one opening 38 in the retaining plate 36 to substantially prevent fluid flow through the at least one opening 38 in the retaining plate 36 towards the outlet 24.

The check valve plate 34 comprises at least one opening through which fluid may flow when the check valve plate 34 is in a position to permit fluid flow. When fluid flow is in the outlet-to-inlet direction, the second valve element 34 is movable away from the restriction plate 36 and towards opening 32 to permit fluid flow through the passageway 30 to the at least one opening in the restriction plate 36 and the check valve plate 34, through opening 32 to the valve inlet 22. Fluid flowing through the valve 20' in the outlet-to-inlet direction establishes pressure against the check valve plate 34 to move the check valve plate 34 away from the at least one opening in the restriction plate 36 and towards the second valve opening 32. Thus, in reverse flow situations, the check valve plate 34 is movable away from the restriction plate 36 and towards the opening 32, in which position the check valve plate 34 permits fluid flow from the outlet 24 through the at least one opening 38 in the restriction plate 36 and the opening 32 to the inlet 22.

Figure 3:
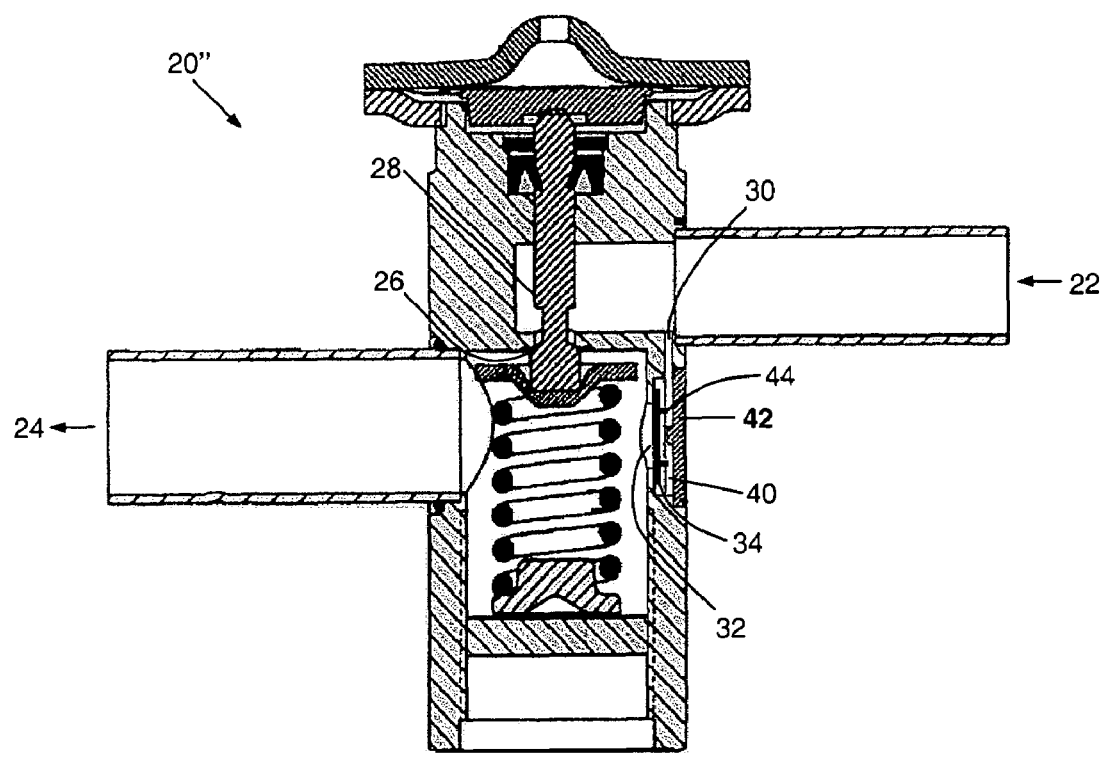
FIG. 3 is a cross-sectional side view of a third embodiment of a thermostatic expansion valve in accordance to the principles of the present disclosure.

In a third embodiment 20" as shown in FIG. 3, the valve comprises a valve body including an inlet chamber 22, an outlet chamber 24, and a check valve chamber 40 having an opening through the side of the valve body. The valve includes a cover 42 secured within the opening in the side of the valve body leading to the check valve chamber 40. The cover 42 is configured to seal off the check valve chamber 40, and is preferably secured within the valve body side chamber 40 by a means selected from one of a group consisting of an interference press fit, an adhesive, an ultrasonic weld, or a weld.

The third embodiment 20" comprises a first valve opening 26 disposed between the inlet chamber 22 and outlet chamber 24, and a control valve element 28 movable relative to the first valve opening 26 to regulate fluid flow from the inlet 22 through the outlet 24 when fluid flow is in the inlet-to-outlet direction. The control valve element 28 is further movable to engage the first valve opening 26 when fluid flow is in the outlet-to-inlet direction to substantially restrict or prevent the fluid flow through the first valve opening to the inlet. Thus, the first valve element 28 does not permit fluid flow from the outlet 24 through the first valve opening 26 to the inlet 22.

The third embodiment further comprises a passageway 30 between the inlet chamber 22 and the check valve chamber 40, where the passageway 30 is entirely disposed within the valve body. A second valve opening 32 is disposed between the check valve chamber 40 and outlet chamber 24. A check valve plate 34 is disposed within the check valve chamber 40, and is movable relative to the second valve opening 32. When fluid flow is in the inlet-to-outlet direction, the check valve plate 34 is movable to restrict fluid flow from the inlet 22 through the second valve opening 32 as shown in FIG. 3. Thus, the check valve plate 34 does not permit fluid flow from the inlet 22 through the second valve opening 32 and passage 30 to the outlet 24.

When fluid flow is in the outlet-to-inlet direction, the check valve plate 34 is movable away from the second valve opening 32 to permit fluid flow from the outlet chamber 24 through the second valve opening 32 around the outer periphery of the check valve plate 34 and through the passage 30 to the inlet 22. The check valve plate 34 may further comprise at least one guide member 44 configured to guide the movement of the check valve plate 34 relative to the second valve opening 32. Thus, in reverse flow situations, the check valve plate 34 is movable away from the second valve opening 32 to permit fluid flow from the outlet 24 through the second valve opening 32 and passage 30 to the inlet 22.

In some embodiments, the cover 42 may further comprise a projection for limiting the movement of the check valve plate 34 away from the second valve opening 32. In alternate embodiments, the guide members 44 on the check valve plate 34 may also limit the movement of the check valve plate 34 relative to the second valve opening 32.

Figure 4:
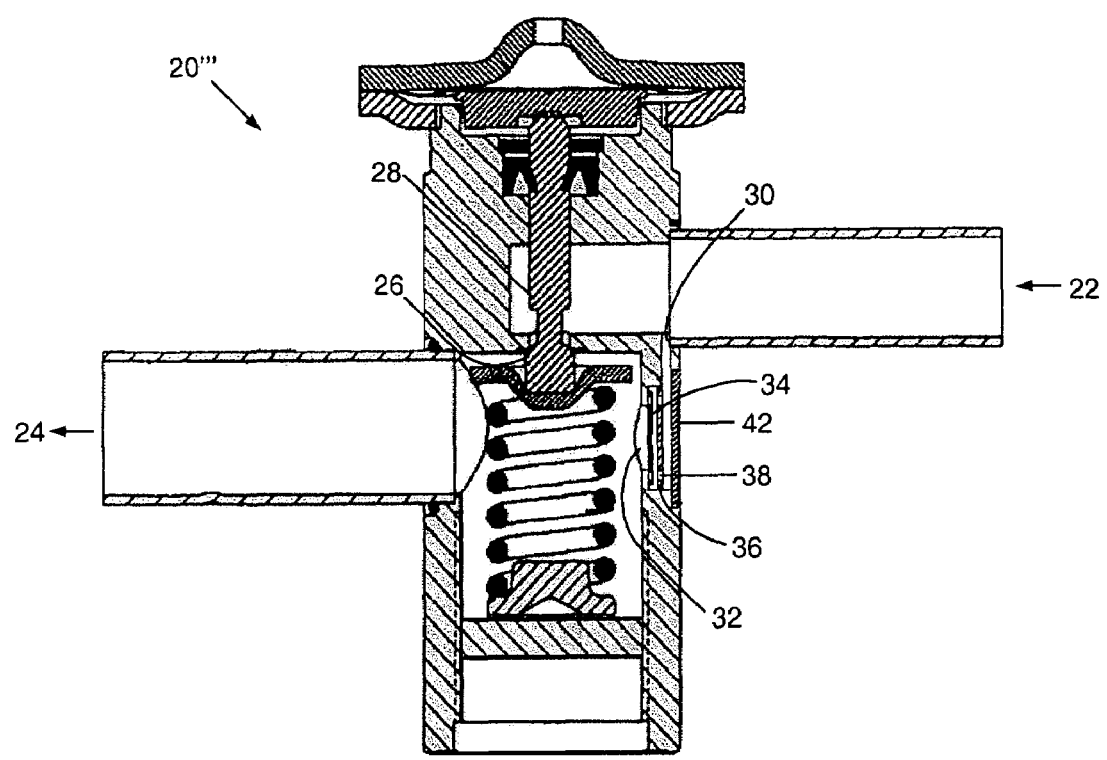
FIG. 4 is a cross-sectional side view of a fourth embodiment of a thermostatic expansion valve in accordance to the principles of the present disclosure.

In a fourth embodiment shown in FIG. 4, the valve 20''' is substantially the same as the third embodiment, with the exception of the check valve plate 34 and cover 42. In this embodiment, the valve further comprises a retaining plate 36 having at least one opening 38 therein through which fluid may flow. The check valve plate 34 comprises at least one opening through which fluid may pass when the check valve plate is in a position to permit fluid flow through the second valve opening 32. When fluid flow through the valve 20''' is in the inlet-to-outlet direction, the fluid pressure against the check valve plate 34 moves the check valve plate 34 against the wall defining the second valve opening 32. In this position, the at least one opening in the check valve plate 34 is against the wall defining the second valve opening 32, such that fluid flow through the at least one opening is substantially restricted. Thus, the check valve plate 34 does not permit fluid flow from the inlet 22 through the passage 30 and second valve opening 32 to the outlet 24.

When fluid flow through the valve 20''' is in the outlet-to-inlet direction, pressure against the check valve plate 34 moves the check valve plate 34 away from the second valve opening 32 to permit fluid flow from the outlet 24 through the second valve opening 32 and the at least one opening in the check valve plate 34. Thus, in reverse flow situations, the check valve plate 34 is movable away from the second valve opening 32, in which position the check valve plate 34 permits fluid flow from the outlet 24 through the at least one opening in the retaining plate 36 and the passageway 30 to the inlet 22.

Figure 5:
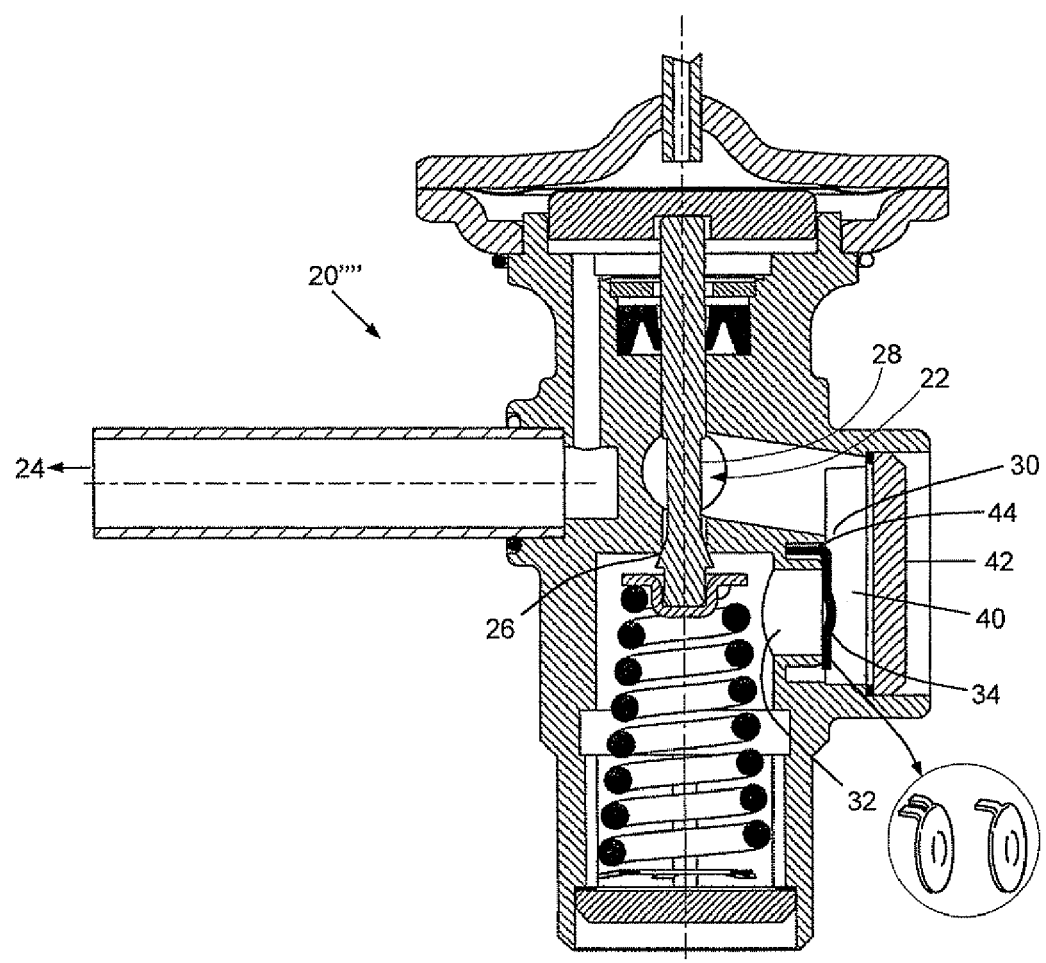
FIG. 5 is a cross-sectional side view of a fifth embodiment of a thermostatic expansion valve in accordance to the principles of the present disclosure.

In a fifth embodiment shown in FIG. 5, the valve 20'''' comprises a valve body including an inlet chamber 22, an outlet chamber 24, a first valve opening 26 and a second valve opening 32 between the inlet and outlet chambers. The fifth embodiment 20'''' comprises a first valve opening 26 disposed between the inlet chamber 22 and outlet chamber 24, and a control valve element 28 movable relative to the first valve opening 26 to regulate the rate of fluid flow from the inlet 22 through the first valve opening 26 to the outlet 24. The control valve element 28 is further movable to engage the first valve opening 26 to substantially restrict or prevent the fluid flow through the first valve opening to the inlet (as a result of fluid pressure at the outlet 24 acting on a diaphragm 48 that causes the valve element 28 to move to a sealed position relative to the first opening). Thus, the first valve element 28 does not permit fluid flow from the outlet 24 through the first valve opening 26 to the inlet 22.

The valve body preferably comprises a check valve chamber 40 having an opening through the side of the valve body. The valve includes a cover 42 secured within the opening in the side of the valve body leading to the check valve chamber 40. The cover 42 is configured to seal off the check valve chamber 40, and is preferably secured within the valve body side chamber 40 by a means selected from one of a group consisting of an interference press fit, an adhesive, an ultrasonic weld, or a weld.

The valve body preferably comprises a passageway 30 between the inlet chamber 22 and the check valve chamber 40, which passageway 30 is preferably disposed entirely within the valve body. A second valve opening 32 is disposed between the check valve chamber 40 and outlet chamber 24. A check valve member 34 is disposed within the check valve chamber 40 adjacent the second valve opening 32, and is movable relative to the second valve opening 32 in response to fluid pressure acting against the check valve member 34. The check valve member has a generally flat portion that resembles a plate, and at least one aligning member projecting therefrom that is slidably disposed within at least one slot in the valve body. The at least one aligning or guide member 44 is configured to guide the movement of the check valve member 34 relative to the second valve opening 32. The at least one aligning member extends from the flat portion in a direction generally parallel with the direction of movement of the check valve member, or in a direction generally orthogonal to flat portion of the check valve plate that engages the second valve opening. The check valve member 34 further comprises a raised portion in the center of the flat portion, which raised portion is adapted to limit the extent of movement of the check valve member within the valve body, in a direction away from the second valve opening. It should be noted that the at least one aligning member 44 of the check valve member 34 may comprise two or more aligning members.

When fluid flow is in the inlet-to-outlet direction, the check valve member 34 is movable to restrict fluid flow from the inlet 22 through the second valve opening 32 as shown in FIG. 5. Fluid pressure acting against the surface area of the check valve member 34 holds the check valve member against the second valve opening 32, to restrict fluid flow from the inlet through the second valve opening 32 to the outlet when fluid is flowing in an inlet-to-outlet direction. Thus, the check valve member 34 does not permit fluid flow from the inlet 22 through passage 30 and the second valve opening 32 to the outlet 24.

When fluid flow is in the outlet-to-inlet direction, the check valve member 34 is movable away from the second valve opening 32 to permit fluid flow from the outlet chamber 24 through the second valve opening 32 around the outer periphery of the check valve member 34 and through the passage 30 to the inlet 22. Thus, in reverse flow situations, the check valve member 34 is movable away from the second valve opening 32 to permit fluid flow from the outlet 24 through the second valve opening 32 and passage 30 to the inlet 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve for controlling bidirectional flow of fluid, comprising:
   a valve body having an inlet chamber, an outlet chamber, a side chamber, and a passageway between the inlet chamber and side chamber, the passageway being entirely disposed within the valve body;
   a cover secured over the side chamber in the valve body, said cover including a flat surface that is spaced apart from the second valve opening and spans across the entire opening area of the second valve opening;
   a first valve opening disposed between the inlet chamber and outlet chamber;
   a second valve opening disposed between the side chamber and outlet chamber;
   a control valve element movable relative to the first valve opening to regulate fluid flow from the inlet through the outlet when fluid flow is in the inlet-to-outlet direction, the control valve element being movable to sealingly engage the first valve opening when fluid flow is in the outlet-to-inlet direction;
   a check valve member disposed in the recess adjacent the second valve opening, the check valve member having a generally flat portion defining a first side that faces the second valve opening, a second side having a raised portion, and at least one generally flat aligning member depending from a peripheral edge of the flat portion, said at least one aligning member projecting generally orthogonally from the flat portion side that faces the second valve opening, and extending in a direction parallel with the direction of movement of the check valve member, the at least one aligning member being slidably disposed within a slot positioned outside the opening area of the second valve opening in the valve body, the check valve member being movable relative to the second valve opening in response to fluid pressure acting against the flat portion, said check valve member being movable to permit the generally flat portion side facing the second valve opening to engage the second valve opening to restrict fluid flow through the second valve opening when fluid flow is in the inlet-to-outlet direction, and movable away from the second valve opening to permit fluid flow through the second valve opening to the inlet chamber when fluid flow is in the outlet-to-inlet direction, wherein the at least one aligning member is configured to slide within the at least one slot to guide the movement of the check valve member relative to the second valve opening, and the raised portion is sized such that when the check valve member is moved away from the second valve opening, the raised portion engages the flat surface of said cover before the alignment member slides out of said slot, to thereby prevent said alignment member from sliding out of said slot.

2. The valve of claim 1, wherein fluid pressure acting against the surface area of the check valve member holds the check valve member against the second valve opening, to restrict fluid flow from the inlet through the second valve opening to the outlet when fluid is flowing in an inlet-to-outlet direction.

3. The valve of claim 1 wherein the check valve member further comprises a raised portion that is on the side opposite the at least one aligning member, and is adapted to limit the extent of movement of the check valve member away from the second valve opening.

4. The valve of claim 1 wherein the at least one aligning member comprises at least two members projecting from the flat portion of the check valve member.

5. The valve of claim 1, wherein the cover is secured to the valve body for enclosing and sealing off the side chamber.

6. The valve of claim 5 wherein the cover plate is secured within the valve body side chamber by a means selected from one of a group consisting of an interference press fit, an adhesive, an ultrasonic weld, or a weld.

7. A valve for controlling bidirectional flow of fluid through the valve comprising:
   a valve body having an inlet chamber and an outlet chamber;
   a first valve opening disposed between the inlet chamber and outlet chamber;
   a second valve opening disposed between the inlet chamber and outlet chamber;
   a control valve element being movable relative to the first valve opening to regulate the rate of fluid flow from the inlet through the outlet, and being movable to sealingly engage the first valve opening to restrict fluid flow through the first valve opening;
   a cover plate secured to the body for enclosing a chamber defined by a recess in the valve body adjacent the second valve opening; and
   a check valve member disposed within the recess adjacent the second valve opening, the check valve member having a generally flat portion defining a side that faces the second valve opening, and at least one generally flat aligning member depending from a peripheral edge of the flat portion, said at least one aligning member projecting generally orthogonally from the flat portion side that faces the second valve opening, and extending in a direction parallel with the direction of movement of the check valve member, the at least one aligning member being slidably disposed within a slot positioned outside the opening area of the second valve opening in the valve body, the check valve member being movable relative to the second valve opening in response to fluid pressure acting against the flat portion, wherein said check valve member is movable to engage the second valve opening to prevent fluid flow through the second valve opening when fluid flow is in the inlet-to-outlet direction, and is movable to permit fluid flow through the second valve opening to the inlet when fluid flow is in the outlet-to-inlet direction; wherein the at least one aligning member is slidably disposed within at least one slot within the valve body so as to slide within the at least one slot to guide the movement of the check valve member relative to a valve opening within the valve body; and wherein the cover portion includes a flat surface that is spaced apart from the second valve opening and spans across the entire opening area of the second valve opening, and the check valve members raised portion is sized such that when the check valve member is moved away from the second valve opening, the raised portion engages the flat surface of said cover before the alignment member slides out of said slot, to thereby prevent said alignment member from sliding out of said slot.

8. A valve for controlling bidirectional flow of fluid through the valve comprising:

a valve body having an inlet chamber and an outlet chamber;

a first valve opening disposed between the inlet chamber and outlet chamber;

a second valve opening disposed between the inlet chamber and outlet chamber;

a control valve element being movable relative to the first valve opening to regulate the rate of fluid flow from the inlet through the outlet, and being movable to sealingly engage the first valve opening to restrict fluid flow through the first valve opening;

a check valve member disposed within a recess adjacent the second valve opening, the check valve member having a generally flat portion defining a side that faces the second valve opening, and at least one generally flat aligning member depending from a peripheral edge of the flat portion, said at least one aligning member projecting generally orthogonally from the flat portion side that faces the second valve opening, and extending in a direction parallel with the direction of movement of the check valve member, the at least one aligning member being slidably disposed within a slot positioned outside the opening area of the second valve opening in the valve body, the check valve member being movable relative to the second valve opening in response to fluid pressure acting against the flat portion, wherein said check valve member is movable to engage the second valve opening to prevent fluid flow through the second valve opening when fluid flow is in the inlet-to-outlet direction, and is movable to permit fluid flow through the second valve opening to the inlet when fluid flow is in the outlet-to-inlet direction; wherein the at least one aligning member is slidably disposed within at least one slot within the valve body so as to slide within the at least one slot to guide the movement of the check valve member relative to a valve opening within the valve body; and wherein the at least one alignment member received within the slot is intrinsically configured to restrict the rotation of the check valve member relative to the second valve opening.

9. The valve of claim 3 wherein the check valve member's raised portion is sized such that when the check valve member is moved away from the second valve opening, the raised portion engages the flat surface of said cover before the alignment member slides out of said slot, to thereby prevent said alignment member from sliding out of said slot.

10. The valve of claim 1, where the at least one alignment member is configured to restrict the rotation of the check valve member relative to the second valve opening, as a result of the generally flat alignment member being received within the slot.

11. A valve for controlling bidirectional flow of fluid, comprising:

a valve body having an inlet chamber, an outlet chamber, a side chamber, and a passageway between the inlet chamber and side chamber, the passageway being entirely disposed within the valve body;

a cover secured over the side chamber in the valve body, said cover including a flat surface that is spaced apart from the second valve opening and spans across the entire opening area of the second valve opening;

a first valve opening disposed between the inlet chamber and outlet chamber;

a second valve opening disposed between the side chamber and outlet chamber;

a slot disposed in the valve body outside of but adjacent to the second valve opening;

a control valve element movable relative to the first valve opening to regulate fluid flow from the inlet through the outlet when fluid flow is in the inlet-to-outlet direction, the control valve element being movable to sealingly engage the first valve opening when fluid flow is in the outlet-to-inlet direction; and a check valve member disposed in the recess adjacent the second valve opening, the check valve member having:

a generally flat portion having a sealing surface on a first side that faces the second valve opening, a raised portion on the generally flat portion, disposed on the side opposite the sealing surface, and a generally flat aligning member depending from a peripheral edge of the generally flat portion and projecting generally orthogonally from the sealing surface side towards the second valve opening, said generally flat alignment member being slidably disposed within said slot, such that the generally flat alignment member is configured to restrict the rotation of the check valve member relative to the second valve opening as a result of the generally flat alignment member being received within said slot, wherein the check valve member is movable in response to fluid pressure acting against the flat portion to permit the sealing surface to engage the second valve opening to restrict fluid flow through the second valve opening when fluid flow is in the inlet-to-outlet direction, and movable away from the second valve opening to permit fluid flow through the second valve opening to the inlet chamber when fluid flow is in the outlet-to-inlet direction, wherein said raised portion is sized such that when the check valve member is moved away from the second valve opening, the raised portion engages the flat surface of said cover before the alignment member slides out of said slot, to thereby prevent said alignment member from sliding out of said slot.

12. The valve of claim 11 wherein fluid pressure acting against the generally flat portion of the check valve member holds the check valve member against the second valve opening, to restrict fluid flow from the inlet through the second valve opening to the outlet when fluid is flowing in an inlet-to-outlet direction.

* * * * *